P. J. LEAVENS.
ALUMINUM RULE.
APPLICATION FILED JULY 25, 1916. RENEWED AUG. 30, 1917.
1,249,132.
Patented Dec. 4, 1917.
2 SHEETS—SHEET 1.
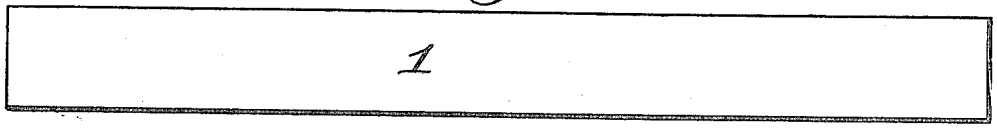
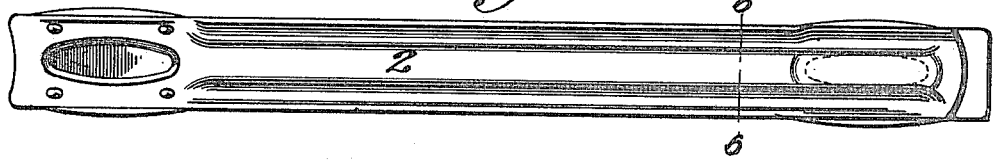
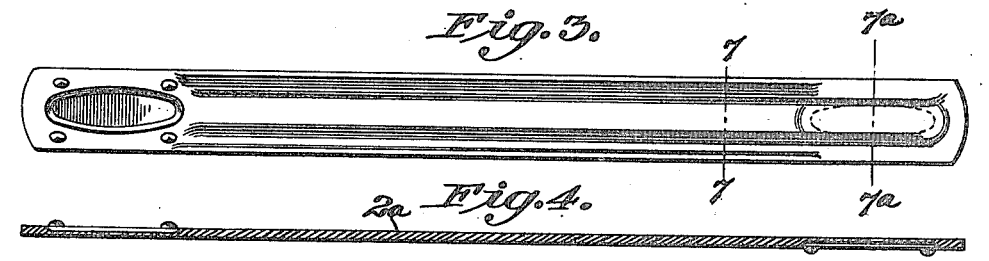
 
 
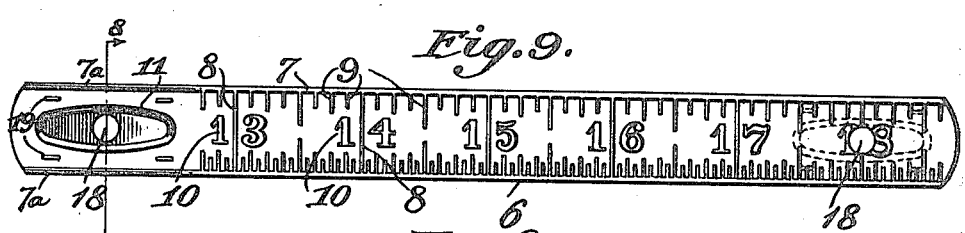
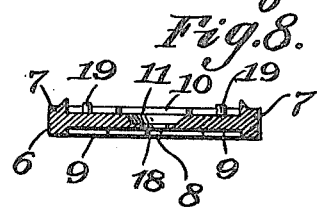
Inventor:
Philip J. Leavens,
By Knight Bros
attys.

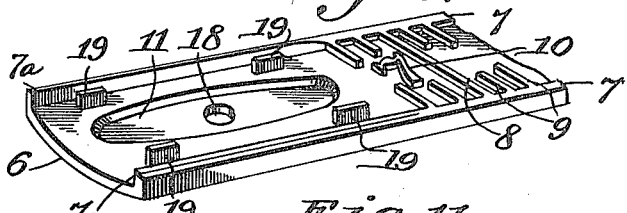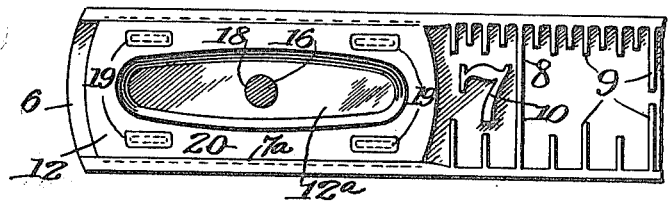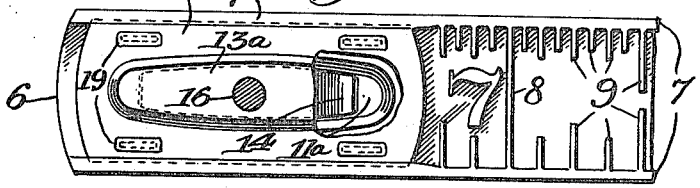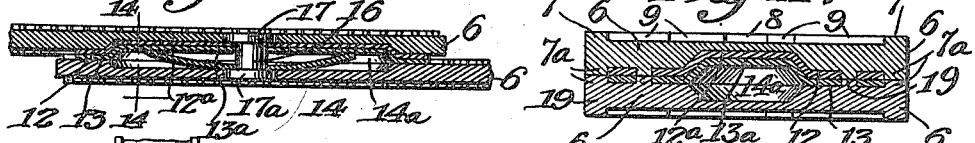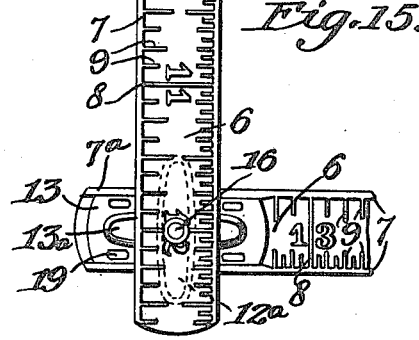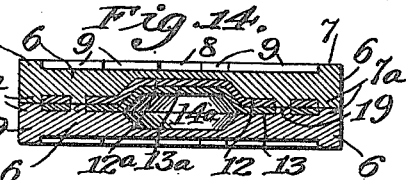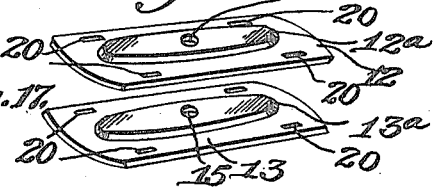

UNITED STATES PATENT OFFICE.

PHILIP J. LEAVENS, OF BRIDGETON, NEW JERSEY.

ALUMINUM RULE.

1,249,132.

Specification of Letters Patent.

Patented Dec. 4, 1917.

Original application filed July 15, 1915, Serial No. 40,091. Divided and this application filed July 25, 1916, Serial No. 111,328. Renewed August 30, 1917. Serial No. 189,041.

*To all whom it may concern:*

Be it known that I, PHILIP J. LEAVENS, a citizen of the United States, residing at Bridgeton, in the county of Cumberland and State of New Jersey, have invented certain new and useful Improvements in Aluminum Rules, of which the following is a specification.

This application is a division of my application filed July 15, 1915, Serial No. 40,091.

This invention relates to measuring rules made of metal, and has for one of its objects to produce rules of novel physical form, in that they are provided with raised, longitudinal, strengthening ribs, together with transverse ribs which serve the dual purpose of providing easily readable graduations and assisting the longitudinal ribs in strengthening the structure of the rule; and which rules shall embody a novel, inherent texture in that the metal is cold-worked and has its section distributed by the steps which develop its physical form, in such manner as to greatly increase its limit of elasticity and resistance to permanent bending; all to the end that the goods may be made of metal having the essential characteristics of aluminum, and, notwithstanding the normally high ductility of that metal, may be made with sufficiently small transverse dimensions and with fineness of lines that will avail in fullest measure of the inherent lightness of the metal and render the production very compact in form when made up of a number of pivotally connected sections.

Another important object of the invention is to utilize, for attaching the joints or hinges, certain physical or structural features that are formed integrally with the rule section in the process of shaping and cold-working the metal rule members; this portion of the work involving, mainly, the forming of the section ends with cavities or depressions and integral dovetailing or doweling projections adjacent thereto, to the ends that the pintle mountings are located with greatest uniformity and consequent accuracy in the finished measuring instrument, and yet the cost is greatly reduced both in labor and material employed in production.

In carrying out the invention, a thin, light blank is treated between suitably shaped pressure faces to form upon the blank, raised areas limited to localize the metal of the blank with relation to the raised markings and ribs to be produced, as for instance by flowing the metal toward its longitudinal middle and edge portions, which is preferably followed by trimming or dressing the partially treated rule member so as to provide it with ultimate edge faces that are adapted to enter into abutment with a suitable confining tool and resist flowing of the metal under the high pressure of the ensuing step; the rule members being then subjected to a stamping operation closely allied to the process of coining, in that the rule member is subjected to high pressure between face dies, while it is confined edgewise; the dies having surface depressions conforming to the raised markings and ribs to be produced, and positioned to act upon the appropriate raised-areas of the blank; in other words, being formed to impart to the rule member, the longitudinal stiffening ribs and transverse ridges which reinforce the stiffening ribs and provide graduation marks, and, preferably, denominational marks as well; these ribs, ridges and denomination characters being formed from the surplus metal distributed by the first step. This method of procedure permits the use of an extremely thin blank, insures very light weight, fine lines and requisite rigidity and strength in the finished rule member, and provides a very compact measuring instrument when a number of rule sections are assembled by overlapping and pivotally uniting their ends.

Incidentally to the production of the rule member with the physical form and inherent texture described, the ends have been treated to form on opposite sides of the respective ends, depressions to receive the hinging accessories, if the rule member is to become a part of a sectional or zig-zag rule of many sections, and with dove-tailing and doweling or riveting projections in position to engage with and be swaged down upon the attaching plates of the pivotally connected and interengaging alining bosses.

The invention will be fully understood upon reference to the accompanying drawings, in which—

Figure 1 is a plan view of the stock or initial blank that is to be treated in producing the new article of manufacture forming the subject of the present invention;

Fig. 2 is a plan view of the partially formed rule member;

Fig. 3 is a plan view of the same after trimming;

Fig. 4 is a view in longitudinal section of the member shown in Fig. 3;

Fig. 5 is a cross-sectional view of the stock, as disclosed in Fig. 1;

Fig. 6 is a cross section on the line 6—6, Fig. 2;

Fig. 7 is a cross section on the line 7—7, Fig. 3;

Fig. 7ª is a cross section on the line 7ª—7ª, Fig. 3;

Fig. 8 is a cross section on the line 8—8, Fig. 9;

Fig. 9 is a plan view of the finished rule member;

Fig. 10 is a perspective view of one end of the finished rule section prepared to receive its hinging member and pintle;

Fig. 11 is a plan view of the same with the concave hinging member riveted and dovetailed in place and with the pintle in section;

Fig. 12 is a view similar to Fig. 11, showing the convex hinging member that coacts with the hinging member of Fig. 11; said convex hinging member being partially broken away to disclose the leaf-spring beneath it that renders the pintle axially resilient;

Fig. 13 is a longitudinal section through one of the joints, in the plane of its pintle;

Fig. 14 is a transverse section through the same joint in a plane remote from the pintle and beyond the end of the spring;

Fig. 15 is a detail view, showing the pivotally connected ends of two rule members;

Figs. 16 and 17 are perspective views of two coöperating pintle plates, and

Figs. 18 and 19 are sectional detail views showing two steps in the dovetailing of the pintle plate to the rule member.

Referring to the drawings, 1 represents a blank which is preferably cut from a sheet of metal that is essentially aluminum and substantially as it comes from the rolls by which the sheet was produced. Sheet aluminum of this quality, while already subjected to sufficient pressure to roll it out from the ingot into sheets, is nevertheless unsuitable for rule purposes unless used in undesirable thicknesses, owing mainly to the fact that its relatively high ductility leaves the metal not materially changed in its capacity to resist bending, and altogether unsuitable for the production of rule sections, notwithstanding the recognized desirability of the metal aluminum for such a purpose so far as concerns its lightness, its resistance to corrosion and other qualities generally recognized as inherent in this particular metal. Where such metal has been used for the production of rules, it has generally been alloyed with other material to give it resisting power, or has been used with such thickness as to make the article comparatively undesirable.

The stock 15 is first subjected to a pair of suitable forming dies, or a forming die and a platen, which are so shaped as to draw up raised areas restricted to render them suitable for supplying needed metal for the raised ribs and markings, as for instance, by reducing the metal along both sides of the center of the blank, and in so doing, cause the metal to flow toward the center and edges and thus produce the second-stage blank 2, as illustrated in Figs. 2 and 6. The second-stage blank will, therefore, include thickened edges 3 and a thickened central portion 4. The spaces intermediate the central portion and edges of the first-stage blank define longitudinally extending grooves or channels 5, the thickness of the metal at these points being less than that of the initial blank 1. The somewhat distorted edges and ends of the first-stage blank are then trimmed, the resulting formation being the piece 2ª disclosed in Figs. 3, 4, 7 and 8, and constituting the third-stage blank, which has the exact external shape and dimensions, edgewise of the finished article.

The third-stage blank is then preferably confined in a rim or frame of sufficient rigidity to resist expansion under very high pressures, and fitting the trimmed edge-faces of the work-piece with sufficient accuracy to prevent expansion of the rule member; and therein subjected to the action of the finishing die or dies having surface depressions corresponding to the ultimate ribs, graduations and hinge attaching lugs located to act upon the appropriate raised areas, and operating under sufficiently high pressure to materially condense the blank throughout the main portion of its area and convert it into a rule section which is hard, dense and resilient; these finishing dies being suitably engraved to simultaneously produce upon the surfaces of the rule section, longitudinal or side marginal strengthening ribs 7, and transverse graduation ridges 8, 9. The ridges 8 preferably abut or extend between both the longitudinal ribs and are integral therewith so as to assist the ribs in rendering the rule section capable of resisting considerable force or bending moment. The ridges 9 are shorter. While likewise integral with ribs 7 and projecting inwardly from opposite ribs, they extend but part way across. But they lend further stiffness to the structure. During this last step in the process of rule formation, the raised reference characters or numerals 10 are impressed upon the center of the blank by flowing or moving the metal, which constitutes the thickened central portion 4, back toward its original position at the sides of the blank, and in so doing, sufficient metal is moved toward the outer edges of the blank to form the raised graduations or ridges 8, 9, and the side marginal flanges or ribs 7. The flowing or moving of the metal, first toward the center and edges for the formation or production of the raised central characters or numerals 10 and the raised graduations and side flanges, and the partial return of such metal to produce the raised ridges or graduations 8, 9, adjacent the edges of the blank, condenses and compresses the aluminum and converts it into a rule section 6, which is hard, dense and resilient. The particular disposition of ribs and ridges is very effective in resisting those strains to which the sections of a zig-zag rule are unavoidably subjected in opening and closing the rule, namely, torsional strains which result from unavoidable inaccuracies in application of force for swinging the sections to and from their extended positions.

Rule sections produced as above described can be coupled by suitable pintle joints (a preferred type of which is described below), and with this in view, the sections are provided with the oppositely facing depressions 11, 11ª, into one of which, 11, will extend the offset portion 12 of a pintle member 13 (see Figs. 10 to 17), while the other depression 11ª will combine with the hollow side of the co-acting pintle member 13ª and form therewith the housing for the spring 14, which renders the pintle axially resilient.

The pintle members 12, 13, are provided with pintle openings 15 having a diameter adapted to fit the shank of the pintle 16, and these pintle members are adapted to nest together or fit one within the other whenever they are in alinement, and thus hold the rule sections in alinement whether extended or folded. The pintle is provided with heads 17, 17ª, of which the former rests directly upon the offset 12ª of pintle member 12, while the latter head 17ª bears indirectly upon the offset 13ª of the pintle member 13, through means of the plate spring 14, which is located in the housing 14ª. In this way, the pintle members may separate sufficiently to permit the turning of one upon the other in shifting the rule sections from folded to extended position.

No special novelty is claimed for the pintle and pintle members *per se*, but the method of combining them with the rule sections constitutes an important feature of the present invention, since it insures absolute accuracy in the built-up rule by producing the attaching means simultaneously with the calibration of the rule members, and thereby insuring a positive and uniform relationship between the graduations and the pintles on each section, and consequently between the graduations of the several sections. To thus accurately inter-relate the sections of a zig-zag or folding rule, pintle openings 18 are formed in the rule members by dies to which the rule member, preferably in the condition shown in Fig. 9, is presented, with accuracy, through means of a jig that utilizes an adjacent raised graduation 8, so that the location of all pintles must bear a constant relationship to the graduations. By this method of procedure, deviations are wholly avoided, whereas in rules having no raised graduations available for positioning the templet, and in which the pintle opening is located with reference to the rule end, for instance, inaccuracies are unavoidable. Moreover, these pintle openings bear a definite relationship to the depressions 11 and 11ª, which receive the convex portions 12ª and 13ª of pintle members 12 and 13, and also a definite relationship to integral riveting projections 19 formed simultaneously with the graduations and with the pintle depressions. Heads 17, 17ª of the pintles 16 fit in the openings 18, while attaching plates of the pintle members 12 and 13 are stamped with perforations 20 to receive the projections 19. Hence the pintle members and pintles are located with absolute accuracy. To firmly hold the pintle members against lateral displacement upon the rule members, the latter are provided with dovetailing flanges 7ª which constitute continuations of the strengthening rib 7. Pintle members are secured in position by placing them between the flanges 7ª and over the studs 19, while these parts are in the condition shown in Figs. 10 and 18, and then carefully pressing the rule member until the dovetailing flanges and rivets are brought to the condition illustrated in Figs. 11, 12, 14 and 19.

Not only does the above described method of pivoting the rule members together, insure accuracy, but it is very much more economical in cost of material as compared with forming the pintle members with embracing flanges that overlie the edges of the rule sections; moreover, the novel construction of pintle connection adds little or nothing to the thickness of the joint.

I claim:—

1. An aluminum rule member comprising a web, flanges extending perpendicular to and along the edges thereof raised transverse graduations on the web and reference characters upon said web.

2. An aluminum rule member having a web, side marginal flanges perpendicular to the surface of the web, and transverse graduation ridges perpendicular to the surface of the rule member.

3. As a new article of manufacture, a metal rule constructed of aluminum strips compressed into flexible structure and having formed upon its surface raised longitudinal stiffening ribs with transverse graduation ridges, and having the metal between said ribs and graduations condensed.

4. An aluminum rule member comprising a web with edge flanges defining a member substantially I-beam in shape, said web provided with reference characters and transverse graduations marked in relief thereon, the outer surfaces of which extend substantially coplanar with the outer surfaces of said flanges.

5. An aluminum rule member comprising a web, flanges extending along the edges thereof, and raised graduations and reference characters upon said web, said rule section having formed integrally with its end and in predetermined position relatively to its graduations, hinge attaching and positioning means.

6. An aluminum rule comprising rule sections hinged together at their ends, each section comprising a web, flanges extending along the edges thereof, and raised graduations and reference characters upon said web, said rule section having formed integrally with its end and in predetermined position relatively to its graduations, hinge attaching and positioning means, and hinges fitted to said sections by said attaching and positioning means.

7. An aluminum rule member comprising a web, flanges extending along the edges thereof, and raised graduations and reference characters upon said web, said rule section having formed integrally with its end and in predetermined position relatively to its graduations, hinge attaching and positioning means comprising riveting lugs and hinge member embracing means.

8. An aluminum rule member comprising a web, flanges extending along the edges thereof, and raised graduations and reference characters upon said web, said rule section having formed integrally with its end and in predetermined position relatively to its graduations, hinge attaching and positioning means comprising riveting lugs and hinge member embracing means; said embracing means including undercut marginal ledges adapted to be set down upon the hinge-members.

9. An aluminum rule member comprising a web, flanges extending along the edges thereof, and raised graduations and reference characters upon said web, said rule section having formed integrally with its end and in predetermined position relatively to its graduations, hinge attaching and positioning means comprising riveting lugs and hinge member embracing means; said embracing means including undercut marginal ledges adapted to be set down upon the hinge members and recesses in which said hinge-members are counter-sunk.

10. A rule member comprising a web provided with markings and having integral therewith hinge attaching and positioning means on the end portion thereof, in predetermined position relatively to said markings.

11. A rule member having integral therewith upstanding hinge attaching means projecting from the face thereof.

12. A rule member having integral therewith hinge attaching and positioning means comprising integral upstanding riveting lugs adapted to pass through openings in a hinge plate and upstanding integral ledges to engage the edges of such a hinge plate.

13. An elongated rule member of metal having the essential characteristics of aluminum, said rule member having integral portions of its metal raised from its face, in the form of definitely outlined upstanding longitudinal ribs and having the metal of its main body portion condensed whereby the rule member is stiffened and the inherent resiliency of the metal is permanently raised above its otherwise normal condition.

The foregoing specification signed at Bridgeton, New Jersey.

PHILIP J. LEAVENS.